W. F STARR.

Car-Coupling.

No. 6,440. Reissued May 18, 1875.

WITNESSES

Eug. W. Johnson,

E. H. Bates

INVENTOR

William F. Starr,

Shipman & Sturtevant

ATTORNEYS

THE GRAPHIC CO. PHOTO-LITH. 39 & 41 PARK PLACE, N.Y.

UNITED STATES PATENT OFFICE.

WILLIAM FREDERICK STARR, OF ST. JOHN, CANADA.

IMPROVEMENT IN CAR-COUPLINGS.

Specification forming part of Letters Patent No. 159,975, dated February 16, 1875; reissue No. 6,440, dated May 18, 1875; application filed April 17, 1875.

*To all whom it may concern:*

Be it known that I, WILLIAM F. STARR, of St. John, in the Province of New Brunswick and Dominion of Canada, have invented a new and valuable Improvement in Car-Couplers; and I do hereby declare that the following is a full, clear, and exact description of the construction and operation of the same, reference being had to the annexed drawings, making a part of this specification, and to the letters and figures of reference marked thereon.

Figure 1:
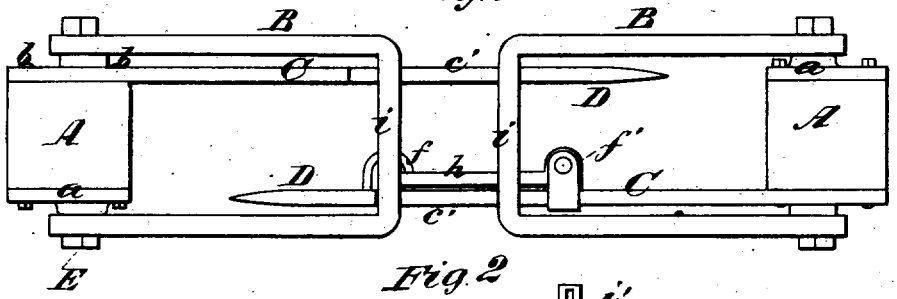
Figure 2:
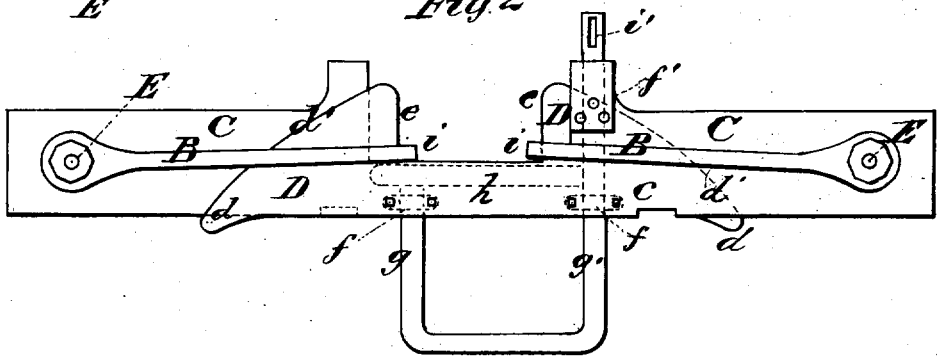
Figure 3:
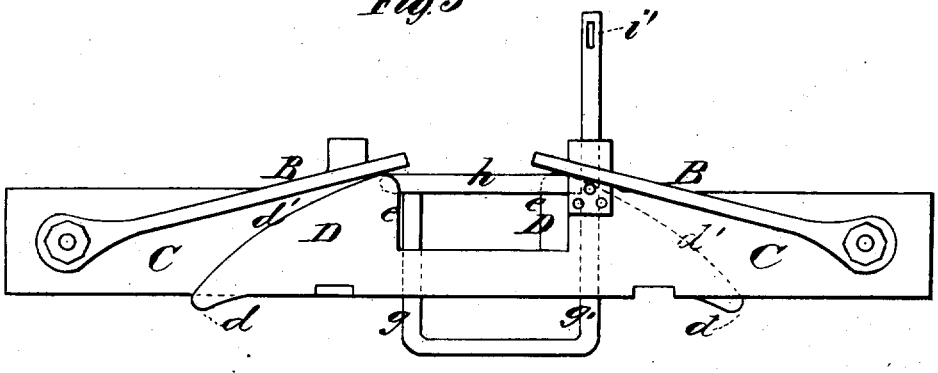

Figure 1 of the drawing is a representation of a top-plan view of my car-coupler, and Figs. 2 and 3 are side views of the same.

My invention consists in certain improvements in car-couplers, as will be hereinafter more fully set forth.

In the annexed drawings, A designates a wooden extension of suitable dimensions, which is rigidly secured in any suitable manner to the ends of two cars. This extension may, however, be a part of the frame-work of the platform or floor of a car, and it is designed to afford bearings for the shaft of a vertically-vibrating coupling-link or loop, B, hereinafter described. One of the lateral faces of this extension is provided with a strong metallic plate, *a*, which, as well as the rigid barbed coupling-arm C, is securely fastened thereto by means of bolts *b*, as shown in Figs. 2 and 3. These coupling-arms are of iron, either wrought, cast, or malleable, or they may be of steel, and they consist of a shank, *c*, having a notch, *c'*, and a barbed head, D, of which the point or nose *d* extends downwardly a certain distance below the lower horizontal edges of the arms, as shown in Figs. 2 and 3, for a purpose hereinafter made clear. E represents a bolt, passing horizontally through registering perforations in plates *a*, extensions A, and coupling-arms C, upon which is hinged and secured in any suitable manner a vertically-vibrating metallic U-shaped loop, B, of suitable strength and width.

When two cars are caused to come together for the purpose of being coupled, the loops B will ascend the upper inclined edge *d'* of barb D, and will finally fall into notch *c'* behind the shoulder *e*, when an effective coupling will be found to have been made.

A coupling having been thus effected, links B, being of considerable width, will allow the cars to sway from side to side without exposing the arms C to be bent or broken; and when, from inequalities in the track, one car is raised higher than the other, or from violent jolting the same effect is produced, one or the other of the links will be engaged with the arms, and a casual uncoupling is thereby rendered impossible.

In the event of one of the cars becoming upset, an uncoupling would be immediately effected.

F represents an endwise-movable U-shaped uncoupling device, vertically arranged in guides *f f* on the coupling-arms C, the legs *g g'* of which are connected by a cross-bar, *h*, upon which the ends *i* of the coupling-links rest, as shown in Fig. 1, when the cars are coupled. Leg *g'* of this device extends upward a suitable distance, and its upper end is provided with a slot, *i*, adapted to receive the weight end of an actuating-lever, by means of which the uncoupler is operated by a train hand at the side of the car.

When the uncoupler F is actuated—that is, raised by a lever, as above described, or by a chain extending to the top of a car—the links or loops will be vibrated upward above the barbs D of coupling-arms C, as shown in Fig. 3, thereby effecting an uncoupling when the cars are moved apart; and if the lever or chain be let go, the uncoupler will automatically fall to the position shown in Fig. 2, set ready for use for a second actuation.

Points *d*, as was above mentioned, extend down the lower horizontal edge of the arms C, thus allowing my improved coupler to be used in cars of different heights; but when the cars are of the same height, points *d* are not necessary, and will be dispensed with.

What I claim as new, and desire to secure by Letters Patent, is—

1. The combination of lifting-loop F, having the cross-bar *h*, with guides *f*, substantially as and for the purpose set forth.

2. In a car-coupler, the vertically-vibratory coupling-link B and the rigid barbed and notched coupling-arms C, in combination with the lifting-loop F, provided with cross-bars *h*, so that both links may be uncoupled at one and the same operation, substantially as set forth.

3. The notched and barbed arms C, in combination with draw-block A or frame-work of a car, and the coupling-link B, spanning both arms C, all substantially as set forth.

In testimony that I claim the above I have hereunto subscribed my name in the presence of two witnesses.

WILLIAM F. STARR.

Attest:
GEORGE E. UPHAM,
M. CARROLL.